United States Patent [19]

Lundquist et al.

[11] Patent Number: 5,133,880
[45] Date of Patent: Jul. 28, 1992

[54] FLUID PURIFIER AND METHOD FOR PURIFYING FLUID CONTAMINATED WITH A VOLATILE CONTAMINANT

[75] Inventors: Joseph E. Lundquist, New Port Richey; Mark R. Christy, Hudson, both of Fla.

[73] Assignee: Pall Corporation, Glen Cove, N.Y.

[21] Appl. No.: 666,400

[22] Filed: Nov. 15, 1990

[51] Int. Cl.$^5$ .................. B01D 19/00; B01D 5/00; B01D 46/00

[52] U.S. Cl. .................. 210/774; 210/85; 210/175; 210/180; 210/188; 210/258; 210/259; 210/767; 210/DIG. 5

[58] Field of Search .............. 210/DIG. 5, 139, 787, 210/188, 774, 767, 259, 175, 258, 85, 90, 180, 741, 742; 55/52, 55, 87, 89, 184, 189, 203, 195, DIG. 25; 62/55.5, 149, 174, 126, 77, 228.1, 473, 475, 498, 9, 37, 115, 172; 417/173

[56] References Cited

U.S. PATENT DOCUMENTS

| | | | |
|---|---|---|---|
| 3,966,602 | 6/1976 | Burger | 210/139 |
| 4,604,109 | 8/1986 | Koslow | 55/52 |
| 4,993,461 | 2/1991 | Yamane | 62/149 |

Primary Examiner—Robert A. Dawson
Assistant Examiner—Sun Uk Kim
Attorney, Agent, or Firm—Leydig, Voit & Mayer

[57] ABSTRACT

A fluid purifier includes a vacuum separator having a rotating disc disposed inside a chamber which is maintained at a negative pressure. Oil contaminated with a chlorofluorocarbon is introduced onto the surface of the disc, and the disc is rotated to disperse the oil into droplets. Chlorofluorocarbons in the oil are vaporized from the droplets to form a vapor. The vapor is condensed to recover a liquid chlorofluorocarbon.

24 Claims, 1 Drawing Sheet

FLUID PURIFIER AND METHOD FOR PURIFYING FLUID CONTAMINATED WITH A VOLATILE CONTAMINANT

BACKGROUND OF THE INVENTION

This invention relates to a fluid purifier for removing a volatile contaminant from a fluid. More particularly but not exclusively, it relates to a fluid purifier for recovering chlorofluorocarbons from hydraulic fluids such as hydraulic oil used in ground and aerospace vehicles.

Certain chlorofluorocarbons (hereinafter referred to as CFC's) are widely used as solvents for cleaning machines on account of their excellent degreasing properties. Examples of such CFC's are Freon TF and 1,1,1-trichloroethane. When a machine is cleaned using a CFC-containing solvent, a thin film of the solvent adheres to the surface of the machine. When the machine is again used after it has been cleaned, the solvent film comes into contact and becomes mixed with oil (such as hydraulic fluid or lubricating oil) for the machine. Furthermore, at the time of cleaning, some of the solvent may drip into an oil sump of the machine and mix with oil in the sump. Therefore, whenever CFC's are used for cleaning a machine, oil in the machine is inevitably contaminated by the CFC's. Small amounts of a CFC-containing solvent in oil are not harmful, but over time, the concentration of the solvent gradually increases and the oil can become diluted to the point that it can no longer be employed and must be replaced.

It is not possible to dispose of oil contaminated with CFC's by burning it for heating purposes, since combustion of the oil releases CFC's into the atmosphere, with adverse effects on the ozone layer. Furthermore, although Freon TF is not particularly dangerous, when trichloroethane 1,1,1, is burned, it can form phosgene, which is highly toxic. In addition, hydraulic fluid for jets may become polluted not only with CFC's but also with jet fuel, which is explosive if improperly burned.

Therefore, at the present time, old hydraulic fluid and other types of oil contaminated with CFC's must be disposed of as a hazardous waste material at considerable expense. For this reason, there is a need for an apparatus which can efficiently remove CFC's from oil without releasing the CFC's to the atmosphere or generating harmful by-products.

It is possible to remove CFC's from oil by adsorption using carbon beds. However, adsorption beds have the drawback that they are too large to be easily transported. Furthermore, they have the problem that they must be regenerated. Regeneration is usually performed using low-pressure steam, which requires large amounts of energy to generate. Equipment must also be provided for condensing the steam and carrying out water separation after the bed is regenerated. Therefore, an adsorption bed is disadvantageous from the standpoints of both size and cost.

It is also possible to remove CFC's from oil using a degreasing still. However, degreasing stills are designed to separate oil from a mixture (such as a mixture of Freon and oil) in which oil is the minor component of the mixture, and they are inefficient for removing small amounts of CFC's from mixtures containing large quantities of oil. Since lubricating oil must be replaced when the concentration of CFC's in the oil is at most about 10%, degreasing stills are unsuitable for purifying such oil.

SUMMARY OF THE INVENTION

Accordingly, it is an object of the present invention to provide a fluid purifier which can efficiently separate CFC's from oil and recover substantially all the separated CFC's in liquid form.

It is another object of the present invention to provide a fluid purifier which can recover CFC's from oil without damaging either the oil or the CFC's.

It is yet another object of the present invention to provide a fluid purifier which is portable.

A fluid purifier for separating chlorofluorocarbons from oil according to the present invention includes a chamber in which a disc having a surface is disposed for rotation about an axis. As the disc is rotated, oil contaminated with a CFC is introduced onto the surface of the disc. The rotation of the disc disperses the oil from the edge of the disc in the form of tiny droplets from which the chlorofluorocarbon in the oil evaporates to form a CFC-containing vapor. A recovery system condenses the CFC-containing vapor to obtain a liquid chlorofluorocarbon. Substantially all the CFC's in the contaminated oil are removed, so the purified oil can be reused or disposed of as a nonhazardous waste. The CFC's that are recovered from the oil are in a concentrated liquid form, so they can be economically disposed of as a toxic waste or can be purified for reuse.

BRIEF DESCRIPTION OF THE FIGURE

The sole FIGURE is a schematic diagram of a fluid purifier embodying the present invention.

DESCRIPTION OF THE PREFERRED EMBODIMENTS

Figure 1:
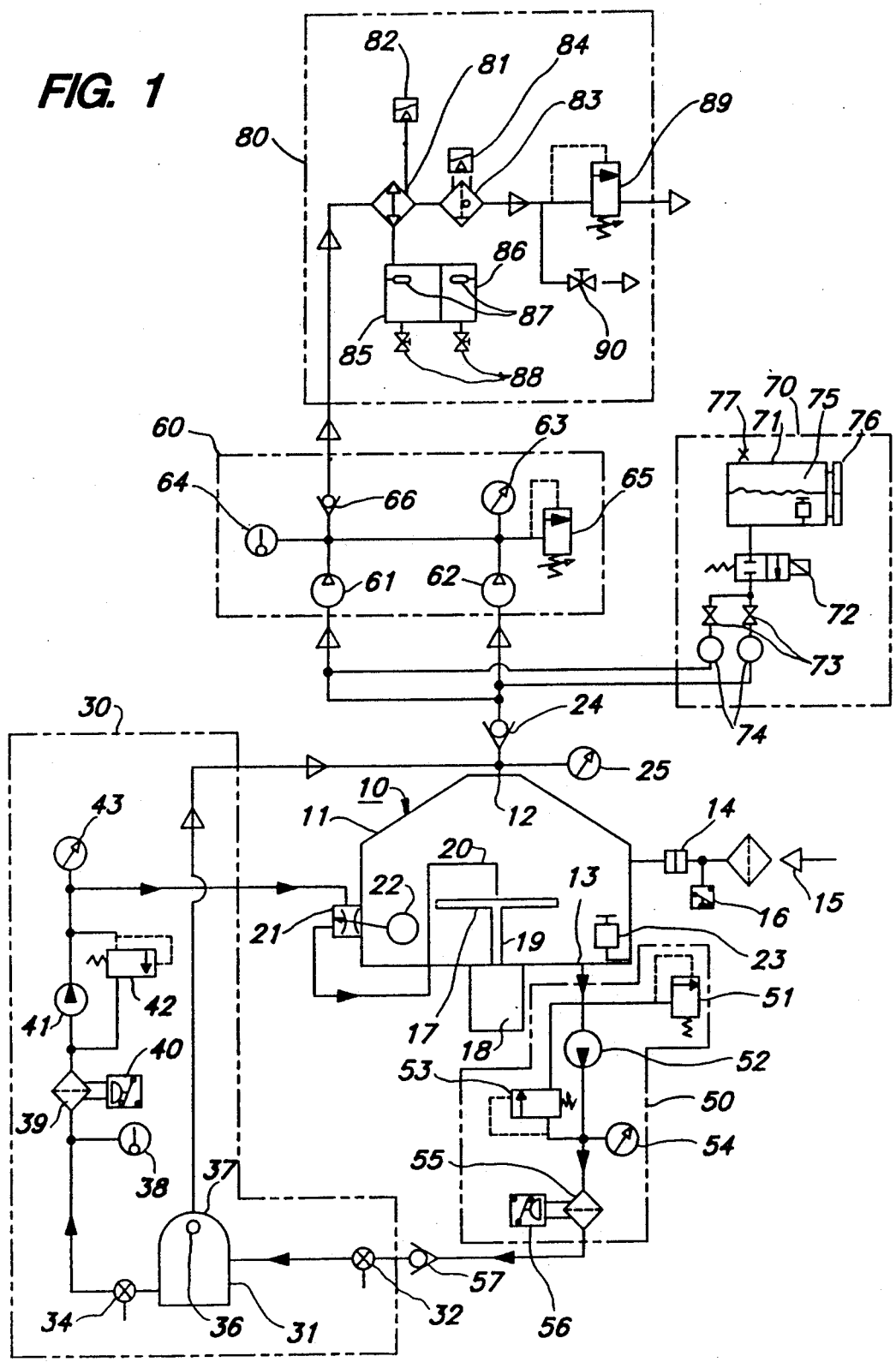

The accompanying FIGURE schematically illustrates an embodiment of a fluid purifier according to the present invention. In the FIGURE, solid arrows indicate the flow paths of fluids while open arrows indicate the flow paths of gases. As shown in this FIGURE, the fluid purifier includes a vacuum separator 10 for separating CFC's from a contaminated fluid by vacuum distillation. The contaminated fluid is supplied to the vacuum separator 10 by a fluid supply system 30. Fluid which has been partially or totally purified by the vacuum separator 10 is removed from the vacuum separator 10 by a fluid removal system 50, while contaminants in the form of CFC's which are separated from the contaminated fluid in the vacuum separator 10 are condensed by a CFC recovery system 80. A negative pressure is generated in the vacuum separator 10 by a vacuum system 60, which is lubricated by a lubrication system 70.

The present invention can be used to separate CFC's from a wide variety of contaminated fluids, including fluids used as lubricants, dielectrics, or coolants. However, the present invention is particularly suited for purification of oils including hydraulic oils such as those designated MIL-H-5606 and MIL-H-83282. Consequently, in the following description, the contaminated fluid to be purified will be referred to as oil.

The vacuum separator 10, which removes the CFC's from oil by vacuum distillation, is preferably a spinning disc purifier, such as the PLM Portable Fluid Purifier available from Pall Land and Marine Corporation. The structure and principles of operation of a spinning disc purifier are described in detail in U.S. Pat. No.

4,604,109. Therefore, the structure of the vacuum separator 10 of this embodiment is illustrated only schematically. As shown in the FIGURE, the vacuum separator 10 comprises a vacuum chamber 11 in which a negative pressure is generated by the vacuum system 60. The vacuum chamber 11 is equipped with a gas exhaust port 12 which is connected to the vacuum system 60, a fluid discharge port 13 through which fluids are removed from the vacuum chamber 11, and an air inlet orifice 14 through which air can be introduced into the vacuum chamber 11. Within the vacuum chamber 11, a flat disc 17 is mounted for rotation on the output shaft 19 of a motor 18, which is mounted on the outside of the vacuum chamber 11 with the output shaft 19 extending into the vacuum chamber 11. Any type of motor, such as an hydraulic motor or pneumatic motor, can be employed to rotate the disc 17. However, from the standpoints of economy and ease of maintenance, an electric motor is usually preferable.

The output shaft 19 of the motor 18 is equipped with an unillustrated mechanical seal for preventing gases and liquids from passing through the bottom of the vacuum chamber 11 where it is penetrated by the output shaft 19. The mechanical seal must be kept lubricated, since it will burn up if the shaft 19 is rotated with the seal dry. Therefore, the motor 18 is connected to a low-level switch 23 disposed inside the vacuum chamber 11 that allows the motor 18 to operate only when the level of fluid in the bottom of the vacuum chamber 11 is high enough to submerge the mechanical seal.

Oil contaminated with one or more type of CFC enters the vacuum chamber 11 through a supply pipe 20 which has one end disposed above the center of the rotating disc 17 and the other end connected to a float valve 21 that controls the flow of oil through the supply pipe 20. The float valve 21 has a float 22 disposed in the vacuum chamber 11 and floating on fluid accumulated in the bottom of the vacuum chamber 11. The float valve 21 is opened and closed by the movement of the float 22 so as to maintain a constant level of fluid in the bottom of the vacuum chamber 11. When the float valve 21 is open, contaminated oil is discharged from the supply pipe 20 onto the center of the rotating disc 17. The rotation of the disc 17 exerts a centrifugal force on the contaminated oil which is fed onto the surface of the disc 17 and causes the oil to migrate outward to the edge of the disc 17 and then be dispersed, i.e., sprayed outward from the disc 17 in the form of very small droplets.

CFC's are extremely volatile, so as the droplets travel towards the peripheral wall of the vacuum chamber 11, a substantial fraction of the CFC's in the droplets are vaporized to form a CFC-containing vapor. In addition to CFC's, the vapor also contains water vapor released from the droplets. Generally, the majority of the resistance to the release of the CFC's and water from the contaminated oil occurs within the volume of the oil. As the very small droplets generated by the rotating disc 17 have a very large surface area-to-volume ratio, the diffusion distance within the droplets is very small and the resistance to release is minimized. CFC's and water tend to flash from the droplets very rapidly, so only a short residence time within the vacuum chamber 11 space is required. Upon impact against the wall of the vacuum chamber 11, the droplets of oil coalesce to form a fluid film and drain down to the bottom of the vacuum chamber 11.

The contaminated oil to be purified by the vacuum separator 10 is stored within a contaminated oil reservoir 31. The reservoir 31 preferably has a three-way drain valve 32 and a three-way fill valve 34 by which the reservoir 31 can be connected to the rest of the apparatus and through which oil can be removed from or introduced into the reservoir 31. The reservoir 31 is preferably only partially filled with oil so that an empty space is left above the surface of the oil. A sight glass 36 can be provided in the reservoir 31 to indicate to the user a suitable filling level. The reservoir 31 also has a gas removal port 37 that is connected by piping to the vacuum system 60. The size of the reservoir 31 is not critical, but as contaminated oil is normally stored in barrels, it is convenient if the reservoir 31 is large enough to hold the contents of an entire barrel.

The illustrated embodiment employs a contaminated oil reservoir 31 to store oil while it is being purified. However, a reservoir 31 is not necessary, and a fluid purifier according to the present invention could be connected directly to a barrel containing contaminated oil, or to the oil sump of a machine containing contaminated oil, for example.

Contaminated oil is drawn from the reservoir 31 by a feed pump 41. To protect the feed pump 41 from damage by particles in the contaminated oil, an oil strainer such as a y-strainer 39 is connected to the inlet of the feed pump 41. The y-strainer 39 may be equipped with a high delta-P shutdown switch 40 that senses the pressure across the y-strainer 39 and shuts down the apparatus when the pressure reaches a prescribed level. The switch 40 may also be connected to an indicator, such as a warning lamp, to alert the user of the apparatus that the y-strainer 39 needs to be cleaned. The feed pump 41 is connected to the supply pipe 20 through the float valve 21. A relief valve 42 is connected in parallel with the feed pump 41 to prevent the feed pump 41 from generating too great a pressure. A pressure gauge 43 can be installed on the discharge side of the feed pump 41 so that a user can ascertain whether the feed pump 41 is working.

The efficiency of vacuum separation in the vacuum separator 10 depends upon the temperature of the contaminated oil introduced into the vacuum chamber 11. The higher the oil temperature, the faster CFC's can be removed. However, for safety reasons, it is generally not permissible to heat the contaminated oil, especially when the contaminated oil may contain an explosive component such as jet fuel. On the other hand, if the temperature of the oil is too low, vacuum separation will progress so slowly as to be impractical. Therefore, a temperature gauge 38 can be installed between the reservoir 31 and the feed pump 41 to indicate to the user if the oil temperature is sufficiently high to make vacuum separation practical. Generally, separation is not efficient unless the oil temperature is at least 40° F.

It is possible to speed up separation in the vacuum chamber 11 by warming the contaminated oil to a moderate temperature of up to about 145° F. However, warming the oil prior to vacuum separation has the effect of increasing the load on the vacuum system 60 and shortening the life span of the equipment in the vacuum system 60 or requiring the use of equipment of greater capacity. Therefore, the advantages of increasing the speed of vacuum separation by warming the oil must be balanced against the increased equipment costs. In the present embodiment, the fluid supply system 30 does not include a heater, but contaminated oil may undergo some warming as it passes through the feed pump 41 or the discharge pump. Preferably, the temperature of the oil as it is fed into the vacuum chamber 11 is in the range from about 70° F. to about 125° F.

Since the contaminated oil that is introduced into the vacuum separator 10 is not heated to a high temperature, a single pass through the vacuum separator 10 may be inadequate to fully purify the oil. Therefore, it is usually preferable to connect the fluid supply system 30 to the fluid removal system 50 and pass all the oil in the oil reservoir 31 through the vacuum separator 10 a number of times. The number of passes through the vacuum separator 10 will depend on the type of oil being purified, the temperature of the oil, and the amount of CFC's in the oil and can be determined in any suitable manner. For example, during operation of the apparatus, the purity of the oil can be determined by taking a sample from the reservoir 31 through the drain valve 32 or the fill valve 34.

A vacuum separator 10 such as the Portable Fluid Purifier is highly efficient, and if the contaminated oil is passed through the vacuum chamber 11 a sufficient number of times, substantially all (above 99%) of the CFC's in the contaminated oil can be removed. After the oil in the reservoir 31 has reached a sufficient purity, it can be drained and disposed of as desired. For example, because of the extremely low concentration of CFC's in the oil after purification, the oil can be reused, disposed of as a non-toxic waste, or burned.

The oil which accumulates in the bottom of the vacuum chamber 11 is returned to the contaminated oil reservoir 31 by the fluid removal system 50. This system 50 includes a discharge pump 52 that draws fluid from the discharge opening 13 in the bottom of the vacuum chamber 11. In the present embodiment, the feed pump 41 and the discharge pump 52 are operated continuously, so they can be driven by the same drive motor. To ensure that oil is supplied to the vacuum chamber 11 and removed from the vacuum chamber 11 at the same rate, the feed pump 41 is preferably sized to have a greater output than the discharge pump 52. The float valve 21 ensures that the rate at which fluid is actually introduced into the vacuum chamber 11 equals the rate at which fluid is removed by the discharge pump 52 even though the feed pump 41 is pumping faster than the discharge pump 52, and the difference between the output of the feed pump 41 and the discharge pump 52 is passed through relief valve 42 and back to the inlet of the feed pump 41.

To prevent the discharge pump 52 from generating excessive pressure, a relief valve 53 is connected in parallel with the discharge pump 52. A pressure gauge 54 can be installed on the downstream side of the discharge pump 52 to enable a user to tell if the discharge pump 52 is functioning properly.

During normal operation of the vacuum separator 10, a positive pressure is never applied to the inside of the vacuum chamber 11. For this reason, the vacuum chamber 11 is not designed to withstand a large positive internal pressure. If a user accidentally applied even a moderate positive pressure to the inside of the vacuum chamber 11, the top of the vacuum chamber 11 could be blown off. To prevent such an accident from occurring, a relief valve 51 is connected to the discharge opening of the vacuum chamber 11. The relief valve 51 is preferably set to open at a low value, such as 10 psig. The relief valve 51 can be installed so as to communicate with any portion of the inside of the vacuum chamber 11, but preferably it communicates with the inside of the vacuum chamber 11 below the level of oil in the vacuum chamber 11. If the relief valve 51 is so installed, when the pressure inside the vacuum chamber 11 exceeds the setting of the relief valve 51, both oil and gas will be released from the relief valve 51 and will produce a sufficiently loud noise to alert the user to the problem. If the relief valve 51 were installed in a location so that only gas were released, the noise of the gas alone might be too low for a user to easily hear.

Oil discharged from the discharge pump 52 can be passed through a filter 55 to remove particulate matter. An example of a suitable filter is a high efficiency 3-micron (absolute) disposable filter element. The filter 55 may be equipped with a high delta-P switch 56 which monitors the pressure drop across the filter 55. When the differential pressure exceeds a prescribed level, the switch 56 shuts down the apparatus and energizes an unillustrated indicator lamp to indicate the need for the filter 55 to be changed. From the filter 55, the oil then passes through a check valve 57 and then is returned to the reservoir 31. If the oil is intended to be passed only once through the fluid purifier, the oil may be passed from the filter 55 directly into a separate reservoir for purified oil.

The vacuum system 60 generates a negative pressure in the vacuum chamber 11 and withdraws CFC's and water vapor which are liberated from the contaminated oil from the vacuum chamber 11. Theoretically, an air-driven vacuum pump that operates based on the Venturi principle would be advantageous as a means for creating a negative pressure in the vacuum chamber 11, since a shaft-driven pump can possibly heat the CFC-containing vapor which is withdrawn from the vacuum chamber 11 to an undesirable level. However, the exhaust from an air-driven vacuum pump is at approximately atmospheric pressure, and it was found that the low exhaust pressure makes it difficult to condense CFC's from the exhaust gas. Therefore, according to a preferred embodiment, a compressor which can generate a discharge pressure higher than atmospheric pressure (such as a conventional automotive air conditioner compressor) is employed to generate a negative pressure in the vacuum chamber 11 and compress the exhaust gas from the vacuum chamber 11. The number of compressors which are employed is not critical. If a single compressor having a suitable capacity is not readily available, a plurality of compressors 61 and 62 can be connected in parallel to the exhaust port 12 of the vacuum chamber 11 in the manner shown in the FIGURE. The compressors 61 and 62, which may be driven by an electric motor, are connected to the exhaust port 12 of the vacuum chamber 11 by a check valve 24. A pressure gauge 63 monitors the pressure at the discharge ports of the compressors 61 and 62. A relief valve 65 is connected to the discharge ports of the compressors 61 and 62 in order to prevent the generation of excessive pressures.

In the present embodiment, the compressors 61 and 62 function both as vacuum pumps for generating a negative pressure in the vacuum chamber 11 and as compressors 61 and 62 for compressing the exhaust gas from the vacuum chamber 11. These two demands exert an extremely heavy load on the compressors 61 and 62, so lubrication of the compressors 61 and 62 is critical. To ensure the proper operation of the compressors 61 and 62 under this heavy load, a lubrication system 70 is provided for continuously lubricating the compressors 61 and 62. The lubrication system 70 includes an oil reservoir 71 containing a fairly high temperature lubrication oil, such as jet engine lube oil. The oil is released from the reservoir 71 by a solenoid valve 72 and is introduced into the gas inlet lines for the compressors 61 and 62. The rate of supply of the lubrication oil is controlled by separate metering valves 73. A sight glass 74 is installed in each oil supply line so that an user can visually ascertain that each compressor 61 and 62 is being supplied oil. The oil reservoir 71 is equipped with a low level switch 75 that automatically shuts off both compressors 61 and 62 when the oil level in the reservoir 71 falls below a prescribed level, thereby preventing the compressors 61 and 62 from running dry. A sight tube 76 can also be installed on the oil reservoir 71 so that the user can visually check the level of oil. The inside of the reservoir 71 is vented to the atmosphere via a filler cap 77.

The compressors 61 and 62 operate more efficiently when drawing air from the vacuum chamber 11 than when working against a vacuum. Therefore, air from the atmosphere is sucked into the vacuum chamber 11 through the inlet air orifice 14. A breather filter 15 is connected to the inlet air orifice 14 to remove dust and other contaminants from the inlet air. A 6-micrometer absolute disposable filter is suitable as the breather filter 15. A high-vacuum shutdown switch 16 can be connected between the breather filter 15 and the orifice 14 to shut down the apparatus and alert an user to change the breather filter 15 when clogging of the breather filter 15 produces an excessive vacuum on the downstream side of the breather filter 15.

The size of the inlet air orifice 14 will determine the degree of vacuum in the vacuum chamber 11. The exact pressure in the vacuum chamber 11 is not critical, but a vacuum in the range from about 15 to about 26 inches of Hg (gauge) has been found to be suitable. The vacuum can be checked by means of a vacuum gauge 25 mounted downstream of the exhaust port 12 of the vacuum chamber 11.

The most precise method of determining when all the CFC's have been removed from the oil in the oil reservoir 31 is to analyze a sample taken from the reservoir 31. However, the pressure and the temperature on the discharge sides of the compressors 61 and 62 are good indicators of whether purification of oil in the vacuum separator 10 has been completed. When purification begins and the compressors 61 and 62 begin to compress CFC's, the load on the compressors 61 and 62 increases, so the discharge temperature of the compressors increases. When substantially all the CFC's have been liberated from the contaminated oil, the compressors 61 and 62 are compressing mostly air, so the discharge temperature of the compressors decreases again. Correspondingly, the chamber vacuum will decrease when the CFC level is high and will increase when the CFC's are substantially removed. Therefore, the user of the apparatus can determine approximately when purification has been completed by observing when the temperature falls, as seen from the temperature gauge 64, and when the vacuum increases, as seen from the vacuum gauge 25.

The temperature of the exhaust gas from the compressors 61 and 62 is preferably in the range of 130° to 200° F. If the temperature becomes too high, the CFC's in the gas may be damaged, and if the gas contains jet fuel removed from the oil, there is the danger of the jet fuel igniting.

Since the CFC's in the contaminated oil are highly volatile, a small portion of the CFC's can evaporate from the oil inside the reservoir 31 and accumulate as vapors in the top portion of the reservoir 31. To ensure that these vapors are also recovered instead of remaining in the reservoir 31, the gas removal port 37 in the upper portion of the reservoir 31 is connected by piping to the exhaust port 12 of the vacuum chamber 11. The vapors in the reservoir 31 are sucked from the reservoir 31 by the suction of the compressors 61 and 62 and compressed together with the vapors from the vacuum chamber 11.

As a result, the inside of the reservoir 31 is under a negative pressure, so the feed pump 41 is necessary to supply contaminated oil from the reservoir 31 to the vacuum chamber 11. However, it is instead possible to create a positive pressure inside the reservoir 31, in which case the contaminated oil can be supplied to the vacuum chamber 11 by the pressure in the reservoir 31 without the use of a feed pump 41. Alternatively, it is possible to use an open reservoir 31 and to draw fluid into the vacuum chamber 11 by the negative pressure existing inside the vacuum chamber 11. However, CFC's can evaporate from oil in an open reservoir 31 and pollute the atmosphere, so a closed reservoir 31 is preferable.

The exhaust gas from the compressors 61 and 62 is a mixture of compressed air, CFC's, and water vapor. This exhaust gas is supplied to the CFC recovery system 80 via a check valve 66. In the recovery system 80, the CFC's and water vapor in the exhaust gas are condensed in a condenser 81. It is conceivable to condense the CFC's removed from the vacuum chamber 11 by cooling at atmospheric pressure, but this is not practical, since at atmospheric pressure, it is necessary to cool the CFC's to far below the freezing point of water in order to perform condensation. At this temperature, water vapor mixed with the CFC's freezes and ices up the condenser 81. Therefore, in this embodiment the CFC's, water vapor, and air which are withdrawn from the vacuum chamber 11 are preferably compressed by the compressors 61 and 62 to a pressure such that substantially all the water vapor and CFC's can be condensed in the condenser 81 at a temperature above the freezing point of water. The condenser 81 need not be of any particular type. In the illustrated embodiment, the condenser 81 is an air-cooled condenser having a cooling unit that blows chilled air at approximately 35° F. over pipes containing the compressed exhaust gas from the compressors 61 and 62. The discharge pressure of the compressors 61 and 62 can be set in accordance with the temperature at which the condenser 81 is to perform condensation. For example, when cooling is performed at 35° F., the pressure of the compressed gas in the condenser 81 can be approximately 200 psig. When the compressed gas is condensed in the condenser 81 at room temperature, the gas must be compressed to a higher pressure, such as around 300 psig.

If the cooling unit for the condenser 81 is not functioning properly so that it is not adequately cooling the exhaust gas from the compressors 61 and 62, the CFC's in the exhaust gas will not be condensed and may be released to the atmosphere. To prevent this from occurring, the condenser 81 is equipped with a temperature switch 82 that shuts down the apparatus when the temperature of the cooling unit of the condenser 81 rises above a prescribed level.

In the condenser 81, substantially all the CFC's and water vapor in the exhaust gas from the compressors 61 and 62 are condensed and drained into a first drain tank 85. The exhaust gas from the condenser 81 contains droplets of the lubricating oil from the compressors 61 and 62, so the condenser exhaust gas is then passed through a coalescer 83, in which the droplets of oil are coalesced into a liquid and drained into a second drain tank 86. The size of the coalescer 83 can be determined in accordance with the flow rate, the temperature, and the liquid contact of the fluid. A delta-P switch 84 measures the pressure differential across the coalescer 83 and shuts down the apparatus when the pressure difference exceeds a prescribed level.

Each drain tank is equipped with a drain valve 88 for allowing the condensate to be discharged from the tanks. High-level shutdown switches 87 sense the level of condensate in each drain tank and automatically shut down the apparatus when either level exceeds a prescribed value. The high-level switches 87 can also be connected to a warning indicator that alerts a user of the need to empty the drain tanks.

The first drain tank 85 and the second drain tank 86 are separate from each other in this embodiment because the air pressure in the condenser 81 is higher than the air pressure in the coalescer 83 in the drain tank. If a single drain tank were used for both the condenser 81 and the coalescer 83, the higher air pressure in the condenser 81 would impede the drainage of fluid from the coalescer 83.

The exhaust gas from the coalescer 83 is essentially compressed air and should be substantially free of CFC's and oil, so it can be discharged into the atmosphere. However, for safety, a hazardous vapor sensing unit can be installed to monitor the exhaust airstream from the coalescer 83. When the sensing unit detects the presence of dangerous vapor concentrations in the exhaust gas, it shuts down the apparatus and activates a warning indicator. Various types of sensors can be employed in the sensing unit. For example, the sensing unit may include a CFC sensor and a separate oil vapor sensor, or it may have an integrated sensor capable of sensing both oil vapor and CFC's, or it may comprise a single sensor for the contaminant having the lower boiling point.

To maintain the pressure within the recovery system 80 at a pressure high enough to condense CFC's at a temperature above the freezing point of water, a pressure regulator 89 is installed downstream of the coalescer 83 for releasing exhaust gas only when it is above a prescribed pressure, such as 200 psi. If the exhaust gas from the compressors 61 and 62 is cooled to below room temperature by water cooling or refrigeration, the pressure can be set by the regulator 89 at a lower value.

A manual relief valve 90 is connected between the coalescer 83 and the pressure regulator 89 to enable a user to vent the recovery system 80 to the atmosphere and release all compressed air so that disassembly or maintenance of the apparatus can be safely carried out.

The liquid which collects in the first drain tank 85 is a mixture of water, one or more CFC's, and a small amount of oil, the CFC's being the primary component (generally 85-95% of the mixture). In contrast, the contaminated oil in the reservoir 31 initially contains on the order of 10% CFC's and 90% oil. As a result of vacuum separation and recovery of the CFC's in the oil according to the present invention, the volume of liquids containing CFC's is reduced by roughly 90%. Therefore, if the CFC's are to be disposed of as a hazardous waste, the cost of their disposal is correspondingly decreased.

Alternatively, instead of discarding the liquid in the first drain tank 85, the liquid can be purified to remove substances other than CFC's. Since the liquid contains only a low percentage of oil, substantially all the oil can be removed from the liquid using a conventional degreasing still to obtain a liquid CFC of extremely high purity suitable for reuse as a solvent.

The fluid that accumulates in the second drain tank 86 can be purified and reused for lubrication.

A fluid purifier according to the present invention can be made extremely compact and easily portable. The illustrated embodiment requires only a source of electric power for its operation, so it can be employed in any location where electric power is available, or it can be run from a portable electric generator. Unlike a conventional adsorption bed, a fluid purifier according to the present invention has no parts requiring regeneration, so it can be run for long periods of time.

What is claimed is:

1. A fluid purifier for removing a volatile contaminant from a fluid comprising:
    a chamber;
    a disc disposed in the chamber and having a surface;
    a fluid supply system for introducing a contaminated fluid containing a volatile contaminant onto the disc surface;
    a spinning mechanism for spinning the disc to form the contaminated fluid on the disc surface into droplets from which the volatile contaminant evaporates to form a vapor;
    a compressor connected to the chamber for removing the vapor from the chamber and compressing the vapor to greater than atmospheric pressure to obtain a compressed vapor; and
    a condenser connected to the compressor for condensing the volatile contaminant contained in the compressed vapor to obtain a liquid contaminant, the condenser having a fluid outlet for liquid contaminant formed in the condenser and a gas outlet for uncondensed gas.

2. A fluid purifier as claimed in claim 1 wherein the compressor comprises means for compressing the vapor from the chamber to a pressure sufficient to condense the volatile contaminant at a temperature above the freezing point of water.

3. A fluid purifier as claimed in claim 1 further comprising a coalescer for removing oil from gas connected in series with and downstream of the gas outlet of the condenser.

4. A fluid purifier as claimed in claim 1 further comprising indicating means for indicating the completion of fluid purification.

5. A fluid purifier as claimed in claim 4 wherein the indicating means comprises a pressure gauge or a temperature gauge connected to the compressor for measuring the suction pressure or the discharge temperature, respectively, of the compressor.

6. A fluid purifier as claimed in claim 1 wherein the chamber has an air inlet for introducing air into the chamber.

7. A fluid purifier as claimed in claim 6 comprising an orifice disposed in the air inlet and sized to obtain a vacuum of approximately 15-26 inches of Hg in the chamber.

8. A fluid purifier as claimed in claim 1 further comprising:
   a reservoir containing the contaminated fluid and connected to the fluid supply system; and
   a fluid discharge mechanism for removing fluid that accumulates in the chamber and introducing the removed fluid into the reservoir.

9. A fluid purifier as claimed in claim 8 further comprising means for maintaining the inside of the reservoir under a negative pressure.

10. A fluid purifier as claimed in claim 9 wherein the reservoir is partially filled with the contaminated fluid, and the inside of the reservoir above the surface of the contaminated fluid is connected to the suction side of the compressor.

11. A fluid purifier as claimed in claim 1 further comprising a relief valve connected to a portion of the chamber which is submerged in fluid during operation of the fluid purifier.

12. A fluid purifier for purifying oil contaminated with a volatile contaminant comprising:
   a purification chamber;
   a disc with a surface disposed in the purification chamber;
   a fluid supply system for supplying oil contaminated with a volatile contaminant onto the surface of the disc;
   a motor for spinning the disc so as to disperse the oil on the surface of the disc into droplets from which the volatile contaminant is vaporized to form a volatile contaminant-containing vapor;
   a compressor connected to the chamber for evacuating the volatile contaminant-containing vapor form the chamber and compressing the vapor to a pressure sufficient to enable the volatile contaminant in the vapor to be condensed at above the freezing point of water;
   a condenser connected to the compressor for cooling the compressed vapor to condense the volatile contaminant in the compressed vapor, the condenser having a fluid outlet for fluid condensed in the condenser and a gas outlet for uncondensed gas;
   a reservoir for the contaminated oil connected to the fluid supply system; and
   a fluid discharge mechanism for removing fluid that accumulates in the chamber and introducing the removed fluid into the reservoir.

13. A fluid purification method comprising:
   creating a negative pressure in a chamber;
   introducing a fluid contaminated with a CFC onto a surface of a disc housed in the chamber;
   spinning the disc to form the contaminated fluid on the disc into droplets from which the CFC evaporates to form a CFC-containing vapor;
   removing the CFC-containing vapor from the chamber and compressing the vapor; and
   cooling the compressed vapor to condense the CFC.

14. A purification method as claimed in claim 13 wherein the vapor is compressed to a pressure sufficient to enable the CFC to be condensed at a temperature above the freezing point of water.

15. A purification method as claimed in claim 13 wherein the step of introducing the contaminated fluid further includes removing the contaminated fluid from a reservoir wherein the method further comprises removing fluid that accumulates in the chamber and introducing the accumulated fluid into the reservoir.

16. A purification method as claimed in claim 15 further comprising maintaining the reservoir at a negative pressure.

17. A purification method as claimed in claim 16 further comprising removing from the reservoir a CFC-containing vapor generated in the reservoir, compressing the vapor from the reservoir, and cooling the compressed vapor from the reservoir to condense the CFC.

18. A purification method as claimed in claim 13 wherein the contaminated fluid is oil, and the temperature of the oil prior to introduction onto the disc is approximately 40°–145° F.

19. A purification method as claimed in claim 13 further comprising stopping purification when the pressure or the temperature of the compressed vapor falls below a prescribed level.

20. A purification method as claimed in claim 13 further comprising introducing air into the chamber via an orifice sized so as to obtain a vacuum of approximately 15-26 inches of Hg in the chamber.

21. A purification method as claimed in claim 13 further comprising separating the condensed CFC from uncondensed gas in the compressed vapor.

22. A purification method as claimed in claim 21 comprising releasing the uncondensed gas to the atmosphere.

23. A purification method as claimed in claim 1, further comprising passing the uncondensed gas though a coalescer subsequent to cooling.

24. A fluid purifier for removing a volatile contaminant from a contaminated fluid comprising:
   a purification chamber having an air inlet for introducing air into the purification chamber;
   a disc with a surface disposed in the purification chamber;
   a closed reservoir for holding a contaminated fluid containing a volatile contaminant;
   a first pump connected between the reservoir and the purification chamber for introducing the contaminated fluid from the reservoir onto the disc surface;
   a spinning mechanism for spinning the disc to form the contaminated fluid introduced onto the disc surface into droplets from which the volatile contaminant evaporates to form a vapor;
   a compressor connected to the purification chamber for removing the vapor from the purification chamber and compressing the vapor to a pressure sufficient to condense the volatile contaminant at a temperature above the freezing point of water to obtain a compressed vapor, the suction side of the compressor being connected to an upper portion of the reservoir;
   a condenser connected to the compressor for condensing the volatile contaminant contained in the compressed vapor to obtain a liquid volatile contaminant;
   a coalescer for removing oil from gas connected in series with and downstream of the condenser;
   a second pump connected between the purification chamber and the reservoir for removing from the purification chamber fluid that accumulates in the purification chamber and returning the removed fluid to the reservoir; and
   indicating means for indicating the completion of fluid purification.

* * * * *